United States Patent
Degawa et al.

(10) Patent No.: US 11,061,635 B2
(45) Date of Patent: Jul. 13, 2021

(54) IMAGE READING APPARATUS, METHOD FOR CONTROLLING IMAGE READING APPARATUS, AND NON-TRANSITORY COMPUTER-READABLE STORAGE MEDIUM

(71) Applicant: CANON KABUSHIKI KAISHA, Tokyo (JP)

(72) Inventors: Ryo Degawa, Toride (JP); Kyosuke Nakano, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/907,923

(22) Filed: Jun. 22, 2020

(65) Prior Publication Data

US 2020/0409641 A1    Dec. 31, 2020

(30) Foreign Application Priority Data

Jun. 27, 2019   (JP) ................................. 2019-120042

(51) Int. Cl.
  *G06F 3/12*   (2006.01)
(52) U.S. Cl.
  CPC .......... *G06F 3/1267* (2013.01); *G06F 3/1208* (2013.01); *G06F 3/1215* (2013.01); *G06F 3/1268* (2013.01)

(58) Field of Classification Search
  None
  See application file for complete search history.

(56) References Cited

U.S. PATENT DOCUMENTS

| 2006/0268362 | A1* | 11/2006 | Bridges | H04N 1/00416 |
| | | | | 358/450 |
| 2012/0019857 | A1* | 1/2012 | Miyajima | H04N 1/00623 |
| | | | | 358/1.15 |
| 2019/0124224 | A1* | 4/2019 | Maeda | G06F 3/1259 |
| 2021/0034313 | A1* | 2/2021 | Narita | H04N 1/00477 |

FOREIGN PATENT DOCUMENTS

JP    H08-237403 A    9/1996

* cited by examiner

*Primary Examiner* — Dov Popovici

(74) *Attorney, Agent, or Firm* — Canon U.S.A., Inc. I.P. Division

(57) ABSTRACT

An image reading apparatus includes a reading unit, an interrupt unit, a control unit, and a selection unit. The reading unit reads an original document. The interrupt unit interrupts a first read job for reading a first original bundle by the reading unit. The control unit executes a second read job, different from the first read job, for reading a second original bundle, different from the first original bundle, by the reading unit while the first read job is interrupted by the interrupt unit. The selection unit selects, from among one or more read jobs interrupted by the interrupt unit, a selected read job to be resumed after the second read job of the second original bundle is completed.

11 Claims, 13 Drawing Sheets

FIG. 9

IF YOU WANT TO RESUME SCAN, PLEASE SELECT JOB TO BE RESUMED AND THEN SELECT YES (START SCAN) BUTTON.

| PENDING JOB NAME | USER NAME | DATE AND TIME ▼ |
|---|---|---|
| SCAN AND SEND | XXX | 05/23 09:45 |
| COPY | YYY | 05/23 09:52 |
| SCAN AND SEND | ZZZ | 05/23 10:02 |

YES (START SCAN) — 902

NO (CANCEL JOB) — 903

901

IMAGE READING APPARATUS, METHOD FOR CONTROLLING IMAGE READING APPARATUS, AND NON-TRANSITORY COMPUTER-READABLE STORAGE MEDIUM

BACKGROUND

Field

The present disclosure relates to an image reading apparatus, a method for controlling the image reading apparatus, and a non-transitory computer-readable storage medium.

Description of the Related Art

In the related art, an image reading apparatus handles read images as a series of images when reading of an original document is interrupted and then the interrupted reading of the original document is resumed (see Japanese Patent Laid-Open No. 08-237403).

During reading of an original bundle, a user sometimes wishes to interrupt the reading of the original bundle and to read a different original bundle for urgent reasons.

In methods of the related art, images obtained when reading of an original bundle is interrupted and thereafter the reading of the original bundle is completed can be identified as a series of images. However, during the interruption of the reading of an original document, it is difficult to read another original document.

SUMMARY

For an image reading apparatus, realization of a mechanism in which when reading of an original bundle is interrupted by reading of another original bundle, the respective reading results of both original bundles can be appropriately obtained.

According to an aspect of the present disclosure, an image reading apparatus includes a reading unit configured to read an original document, an interrupt unit configured to interrupt a first read job for reading a first original bundle by the reading unit, a control unit configured to execute a second read job, different from the first read job, for reading a second original bundle, different from the first original bundle, by the reading unit while the first read job is interrupted by the interrupt unit, and a selection unit configured to select, from among one or more read jobs interrupted by the interrupt unit, a selected read job to be resumed after the second read job of the second original bundle is completed.

Further features of the present disclosure will become apparent from the following description of exemplary embodiments with reference to the attached drawings.

BRIEF DESCRIPTION OF THE DRAWINGS

FIG. 9 is a diagram illustrating an example screen presenting a list of pending jobs according to the embodiment.

DESCRIPTION OF THE EMBODIMENTS

Figure 1:
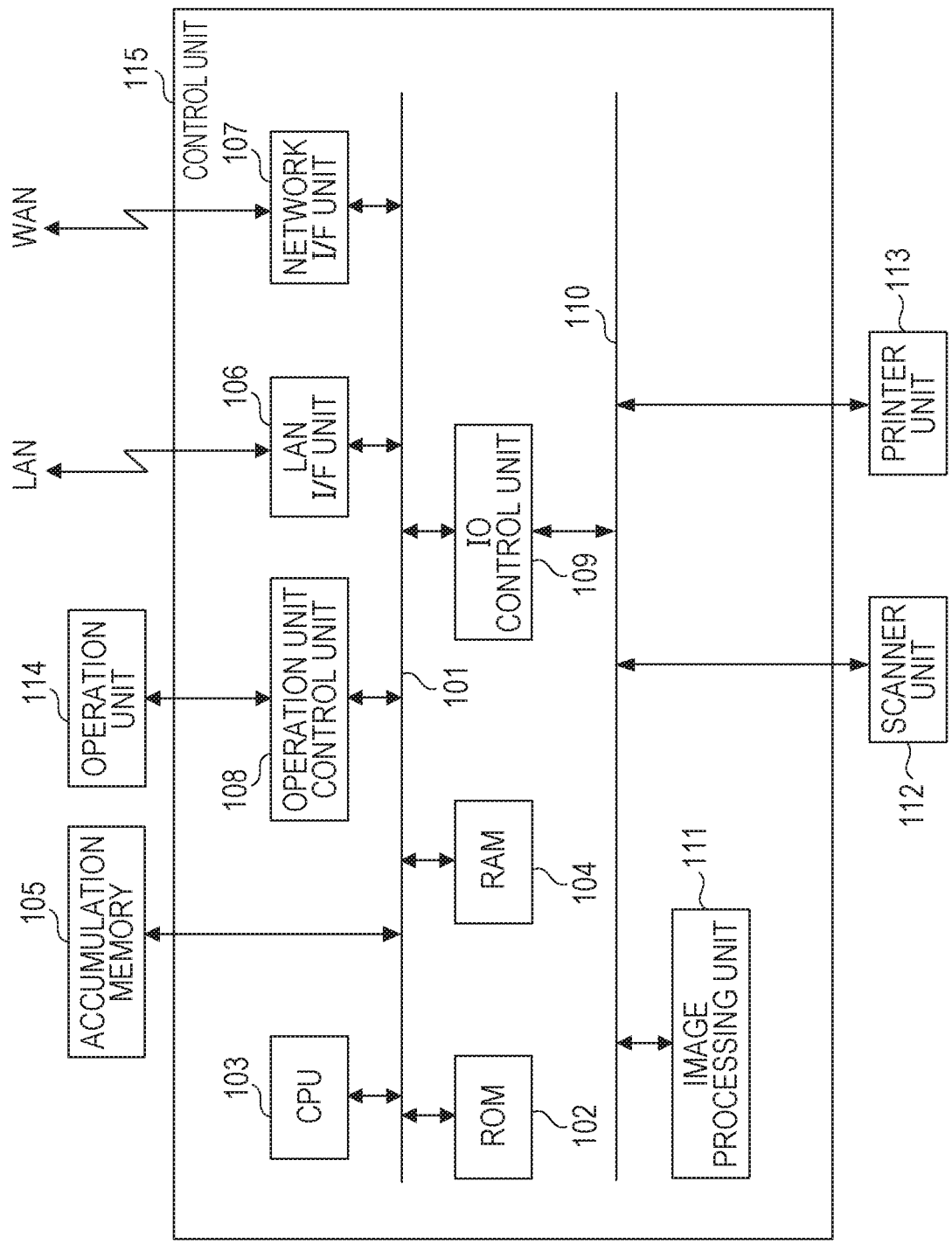
FIG. 1 is a block diagram illustrating a configuration of a multifunctional device according to a first embodiment.

Hereinafter, embodiments will be described in detail with reference to the attached drawings. Note, the following embodiments are not intended to limit the scope of the claimed disclosure. Multiple features are described in the embodiments, but limitation is not made a disclosure that requires all such features, and multiple such features may be combined as appropriate. Furthermore, in the attached drawings, the same reference numerals are given to the same or similar configurations, and redundant description thereof is omitted.

The following describes carrying out the present disclosure with reference to the drawings.

First Embodiment

FIG. 1 is a block diagram illustrating a hardware configuration of a multifunctional device according to a first embodiment of the present disclosure. The multifunctional device may be formed by a single device or a plurality of devices, unless otherwise noted, so long as the functions of the present disclosure are implemented.

The components of a control unit 115 are connected to a system bus 101 and an image bus 110.

A central processing unit (CPU) 103 controls the overall operation of the multifunctional device.

A read only memory (ROM) 102 stores a boot program of the multifunctional device. A program for implementing the functions of the present disclosure is stored in the ROM 102 or an accumulation memory 105 and is executed by the CPU 103.

A random access memory (RAM) 104 is a system work memory area for the CPU 103 to execute software. The RAM 104 is also an image memory for temporarily storing image data to be processed.

The accumulation memory 105 is used as an internal storage device. The accumulation memory 105 stores data read by a scanner unit 112, image data, software, and so on. The accumulation memory 105 is formed by a hard disk drive (HDD) or a solid-state drive (SSD).

A local area network (LAN) interface (I/F) unit 106 is an I/F unit for connecting to a LAN, through which the multifunctional device inputs or outputs information to or from devices connected to the LAN.

A network I/F unit 107 is an I/F unit for connecting to a wide area network (WAN), through which the multifunctional device inputs or outputs information to or from devices connected to the WAN.

An operation unit control unit 108 controls the exchange of data between an operation unit 114 and the CPU 103. The operation unit control unit 108 serves as an interface unit that interfaces with the operation unit 114 (user interface (UI)), and outputs image data to the operation unit 114 to display an image on the operation unit 114. The operation unit control unit 108 also serves to transmit information received from the user of the multifunctional device through the operation unit 114 to the CPU 103. The operation unit 114 is formed by a display unit such as a liquid crystal display (LCD) touch panel, hard keys, and so on, and interprets and displays a video graphics array (VGA) signal output from the operation unit control unit 108.

The components described above are located on the system bus 101.

An input-output (IO) control unit 109 is a bus bridge connected to the system bus 101 and the image bus 110 through which image data is transferred at a high rate to convert the data structure between the system bus 101 and the image bus 110.

The image bus 110 is formed by a general-purpose bus such as a Peripheral Component Interconnect (PCI) bus, an Institute of Electrical and Electronics Engineers (IEEE) 1394 bus, or a Peripheral Component Interconnect Express (PCIe) bus.

The image bus 110 is connected to an image processing unit 111 that processes image data, the scanner unit 112 serving as an image input device, and a printer unit 113 serving as an image output device to perform synchronous/asynchronous conversion of image data.

The image processing unit 111 is formed by a plurality of application-specific integrated circuits (ASICs) to perform image processing, such as resolution conversion, compression and decompression, or binary/multilevel conversion, on input and output image data.

Figure 2:
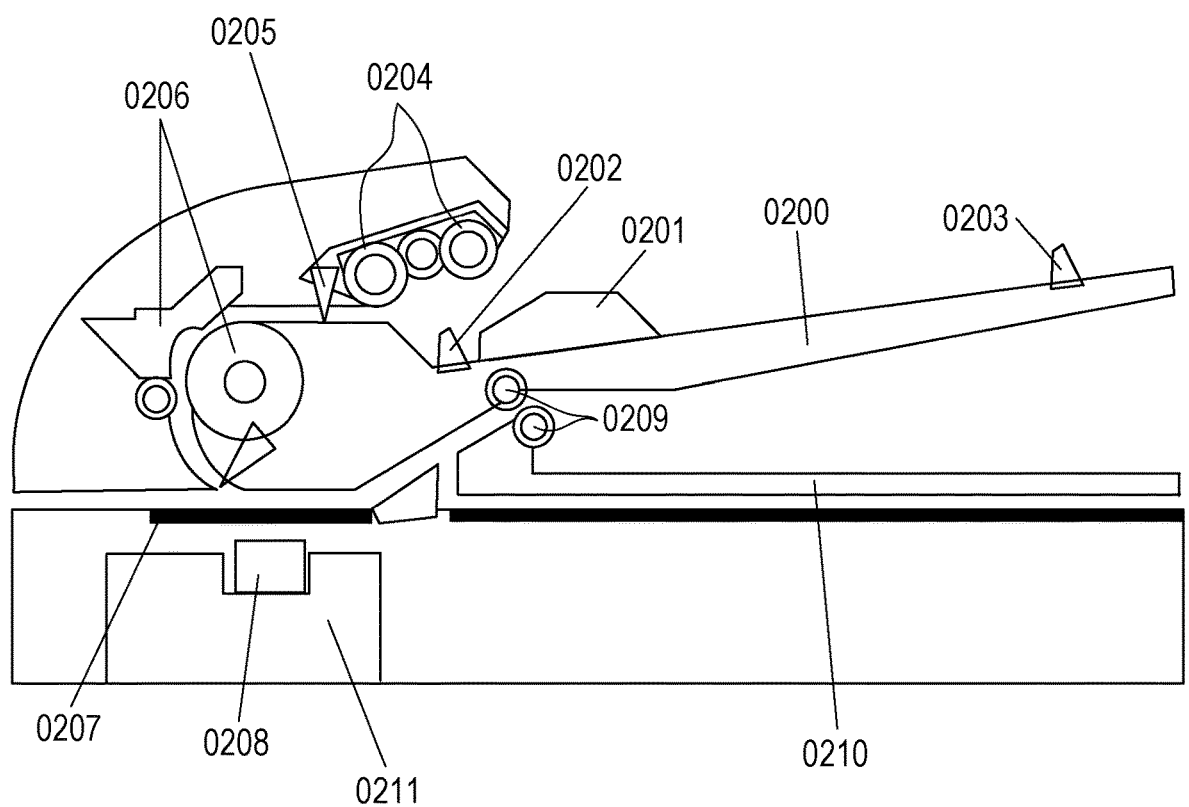
FIG. 2 is a sectional view of a document feeder (DF) unit according to the embodiment.

FIG. 2 is a side sectional view of the internal structure of a document feeder (DF) unit in the scanner unit 112. The DF unit includes an original document tray 0200 on which an original document to be read is placed, and the original document tray 0200 has disposed thereon a document sensor 0202 for sensing the presence or absence of an original document, two original document guides 0201, and an original document size detection sensor 0203. The two original document guides 0201 are arranged side-by-side in the longitudinal direction of an original document (a direction perpendicular to the direction in which an original document is to be fed). The original document placed on the original document tray 0200 is fed by three kinds of rollers, including pickup rollers 0204, feed rollers 0206, and discharge rollers 0209. The pickup rollers 0204 are rollers for feeding the original document placed on the original document tray 0200 into an original document feed path inside the DF unit. The feed rollers 0206 feed the original document fed into the original document feed path by the pickup rollers 0204. The discharge rollers 0209 feed the original document fed by the feed rollers 0206 to a discharge tray 0210. The original document fed by the pickup rollers 0204 is detected by an original document passage detection sensor 0205, and whether the first page of the original document has passed is determined based on the detection time. The feed rollers 0206, the pickup rollers 0204, and the discharge rollers 0209 are driven by a stepping motor, which is not illustrated. Sub-scanning thinning-out processing in the DF unit is implemented by doubling the frequencies of drive pulses for the feed rollers 0206, the pickup rollers 0204, and the discharge rollers 0209. The original document fed by the DF unit is read through a DF read window 0207 by a contact image sensor (CIS) 0208 disposed on a sensor unit 0211 located below the DF read window 0207. The sensor unit 0211 is freely movable, or moveable without meaningful restriction, in the sub-scanning direction and is also movable in the same direction as the feed direction of the original document fed from the feed rollers 0206 toward the discharge rollers 0209. The DF read window 0207 has a certain length in the sub-scanning direction. Within the range of the length, the CIS 0208 can be moved to any position, and the original document can be read at the position to which the CIS 0208 is moved. The CIS 0208 includes photoelectric conversion elements, such as charge-coupled device (CCD) sensors, and concurrently performs a first-in first-out (FIFO) operation for accumulating images for the respective elements and the generation of control signals for controlling the FIFO operation and the CCD sensors. The CIS 0208 is typically implemented as a configuration in which a plurality of photoelectric conversion elements are arranged in a line. The DF unit may include an additional CIS to scan a surface of the original document opposite to the surface scanned by the CIS 0208. The additional CIS may be disposed along a feed path between the discharge rollers 0209 and the CIS 0208.

This embodiment provides a multifunctional device having the configuration described above such that when a read job for an original bundle is interrupted by a read job for another original bundle, the respective reading results of both original bundles can be appropriately output. The previously executed and interrupted read job is referred to as a preceding job or a preceding scan job, and the interrupting read job is referred to as an interrupt job or an interrupt scan job.

Next, processing of a scan job (read job) by the control unit 115 according to this embodiment will be described with reference to a flowchart illustrated in FIG. 3. A program according to this flowchart is stored in the ROM 102 of the control unit 115, read into the RAM 104, and executed by the CPU 103.

Figure 3:
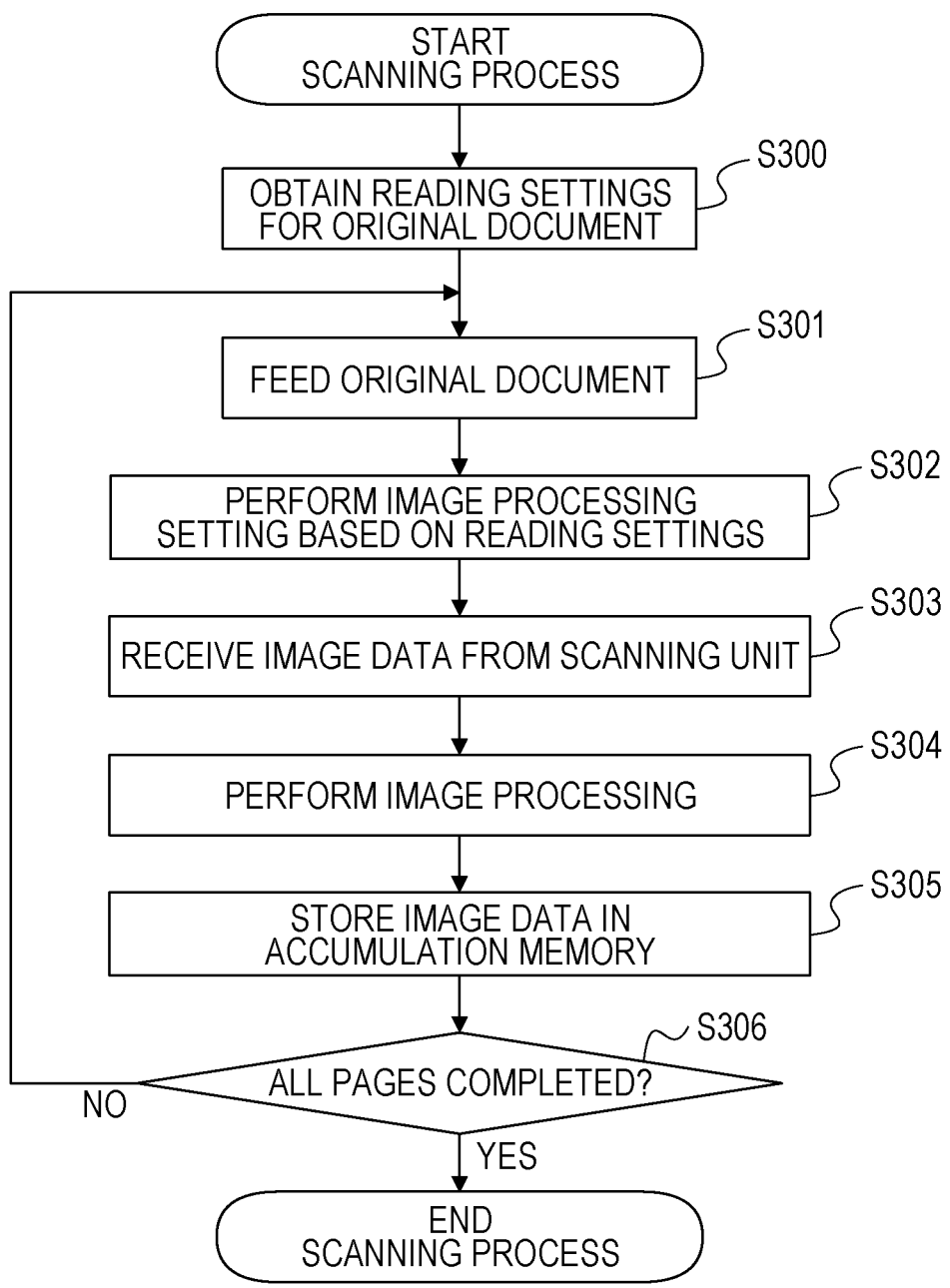
FIG. 3 is a flowchart illustrating a scan according to the embodiment.

A process illustrated in the flowchart in FIG. 3 is started in response to the pressing of a start key of the operation unit 114. In S300, the CPU 103 obtains reading settings for an original document (such as the setting of simplex scanning/duplex scanning and the setting of a reading resolution). The reading settings are set through the operation unit 114 and are stored in the RAM 104.

In S301, the CPU 103 instructs the scanner unit 112 to feed the original document. In response to the instruction, the scanner unit 112 feeds a page of the original document.

In S302, the CPU 103 determines an ASIC to be used to perform a scan, based on the reading settings obtained in S300, and performs setting for the ASIC.

In S303, the CPU 103 receives image data from the scanner unit 112 and stores the image data in the RAM 104.

In S304, the CPU 103 instructs the image processing unit 111 to perform image processing on the received image data.

In S305, the CPU 103 stores in the accumulation memory 105 the image data on which image processing is performed in S304.

In S306, the CPU 103 determines whether all of the pages have been scanned by the DF unit. Specifically, if the original document is still sensed by the document sensor 0202, the CPU 103 determines that not all of the pages have been scanned by the DF unit, and then returns the process to S301. If the original document is no longer sensed by the document sensor 0202, the CPU 103 determines that all of the pages have been scanned by the DF unit, and ends the scan.

Figure 4:
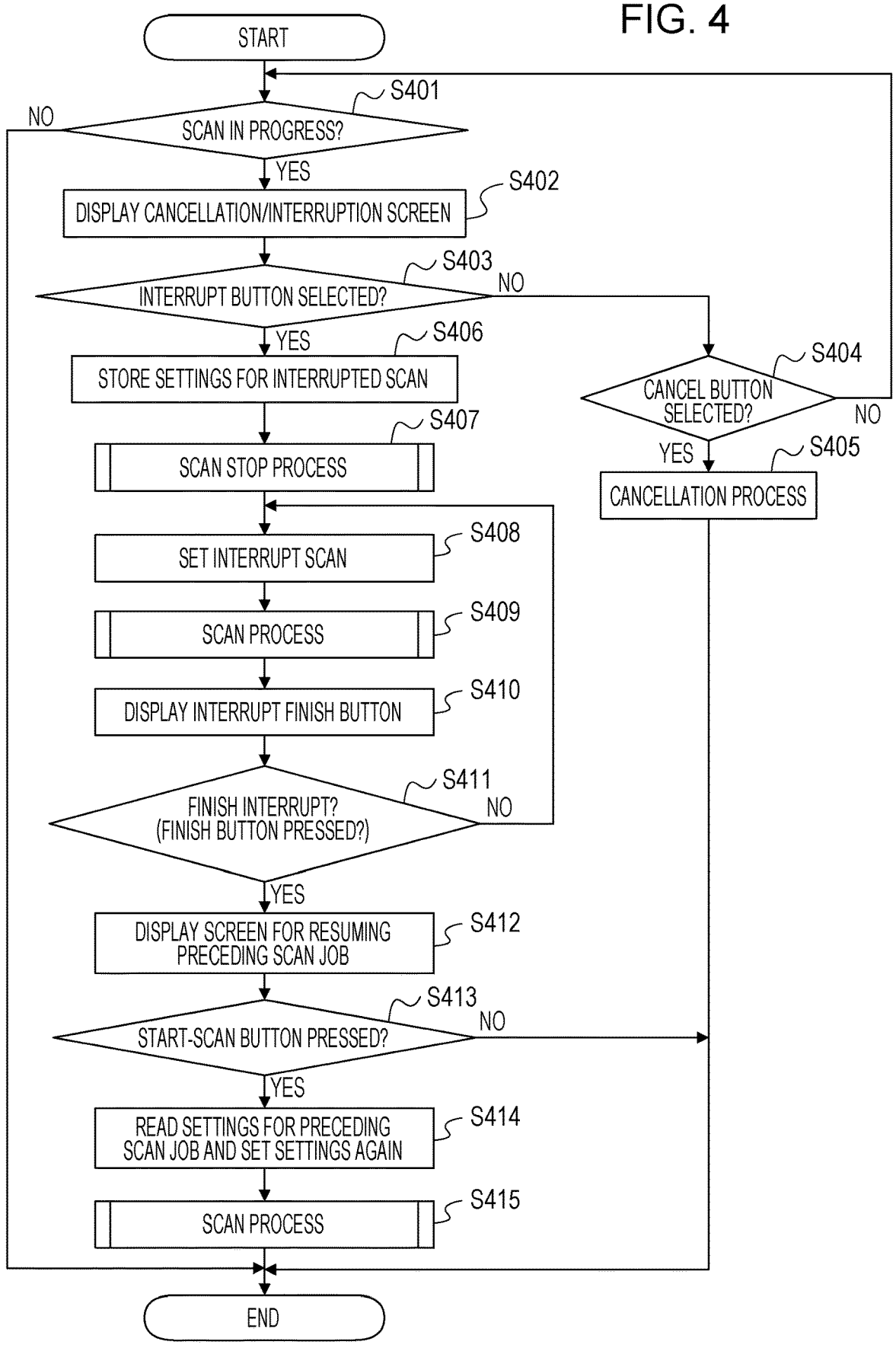
FIG. 4 is a flowchart illustrating an interrupt scan according to the embodiment.

The following describes a process for an interrupt scan by the control unit 115 according to the first embodiment with reference to a flowchart illustrated in FIG. 4. A program for the control unit 115 to perform the process is stored in the ROM 102 of the control unit 115, read into the RAM 104, and executed by the CPU 103. The term "scan", as used herein, refers to a scan in a job involving scanning (such as a SEND or COPY job). In a COPY job, therefore, rather than a typical interrupt copy in which printing in progress is interrupted, an interrupt scan in which a scan in progress is interrupted can be executed.

In S401, the CPU 103 determines whether a scan in a scan job is being executed. If the processing of S301 to S306 is being executed, the CPU 103 determines that the scan is being executed, and then advances the process to S402. If the processing of S301 to S306 is not being executed, the CPU 103 determines that the scan is not being executed. Then, the process according to the flowchart illustrated in FIG. 4 ends.

Figure 5:
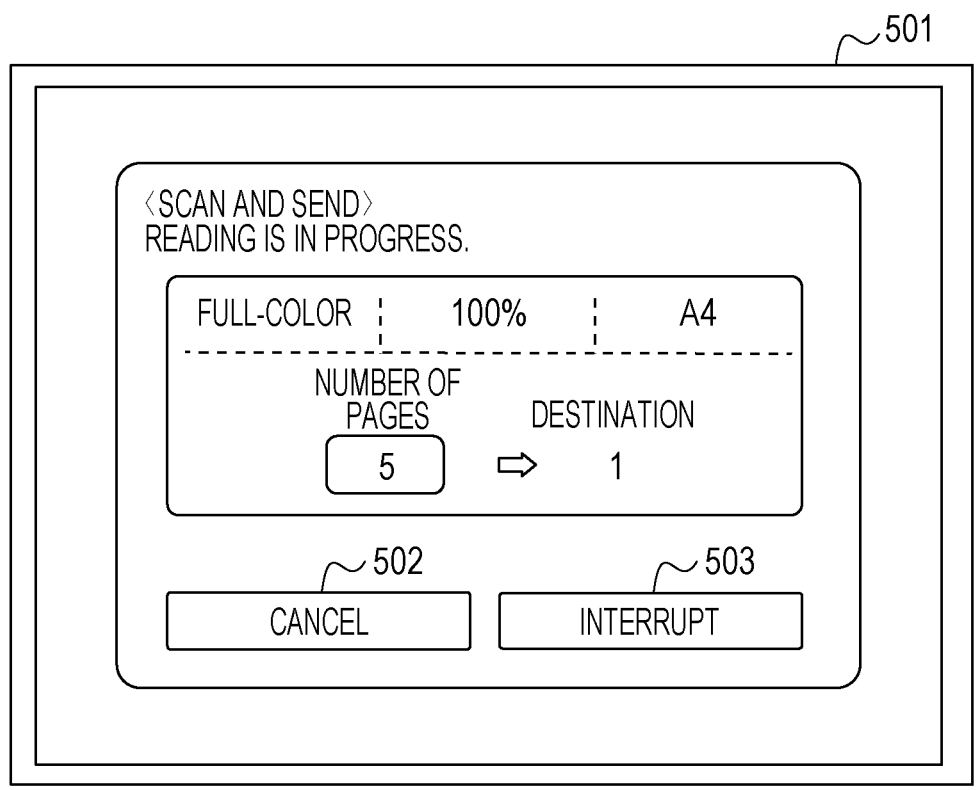
FIG. 5 is a diagram illustrating an example screen for selecting a button for canceling or interrupting a scan according to the embodiment.

In S402, the CPU 103 instructs the operation unit control unit 108 to display a screen illustrated in FIG. 5 (a screen for selecting a button for canceling or interrupting a scan). In response to the instruction from the operation unit control unit 108, the screen illustrated in FIG. 5 is displayed on the operation unit 114.

FIG. 5 illustrates a screen for generating an instruction to interrupt the preceding scan job during the execution of the preceding scan job and to execute an interrupt scan job. The screen illustrated in FIG. 5 is displayed on the operation unit 114 to select cancellation or interruption of the scan. A screen 501 is a screen displayed on the operation unit 114 during the execution of the processing of S301 to S306 in FIG. 3. The operation unit 114 accepts the input of canceling or interruption of the scan through the screen 501. A user selects a Cancel button 502 to cancel the scan, or selects an Interrupt button 503 to interrupt the scan to execute an interrupt scan. In FIG. 5, a scan being executed in a SEND job for reading an image from an original document to generate image data and transmitting the image data via a LAN is described as an example of a scan job, but not limitation. Other examples of the scan job include jobs involving scanning, such as a COPY job, a BOX scan job, and a FAX job. The COPY job is a job for reading an image from an original document using the scanner unit 112 to generate image data and printing an image on a sheet of paper on the basis of the image data. The BOX scan job is a job for reading an image from an original document to generate image data and storing the image data in the accumulation memory 105. The FAX job is a job for reading an image from an original document and transmitting the image via a WAN.

In S403, the CPU 103 determines whether the Interrupt button 503 is selected on the screen illustrated in FIG. 5. If it is determined that the Interrupt button 503 is selected, the CPU 103 advances the process to S406. If it is determined that the Interrupt button 503 is not selected, the CPU 103 advances the process to S404. In S404, the CPU 103 determines whether the Cancel button 502 is selected on the screen illustrated in FIG. 5. If it is determined that the Cancel button 502 is not selected, the CPU 103 returns the process to S401. If it is determined that the Cancel button 502 is selected, the CPU 103 advances the process to S405. In S405, the CPU 103 executes a process of canceling the scan job (cancellation process). Then, the process ends. The canceled job is not resumable, unlike an interrupted job.

If the process proceeds from S403 to S406, in S406, the CPU 103 stores job settings for the interrupted scan job (such as the setting of simplex scanning/duplex scanning and the setting of a reading resolution) in the accumulation memory 105. The job settings are obtained in S300 in FIG. 3.

In S407, the CPU 103 instructs the scanner unit 112 to stop the scan. In response to the instruction to stop the scan, the scanner unit 112 stops the process of reading the original document. Specifically, if the original document is left on the original document tray 0200, the scanner unit 112 does not discharge the rest of the original document. The scanner unit 112 reads and discharges the currently fed page of the original document so that the interrupt job can be executed.

In S408, the user inputs scan job settings for the interrupt scan using the operation unit 114. The CPU 103 stores the input scan job settings (such as the setting of simplex scanning/duplex scanning and the setting of a reading resolution) in the accumulation memory 105.

In S409, the CPU 103 instructs the scanner unit 112 to execute a scan in the interrupt scan job. The scanner unit 112 executes the process illustrated in FIG. 3 on a new original document placed on the original document tray 0200. In this case, in S300, the scan job settings for the interrupt scan job, which are stored in the accumulation memory 105 in S408, are obtained, and the process illustrated in FIG. 3 is executed based on the obtained scan job settings.

Figure 6:
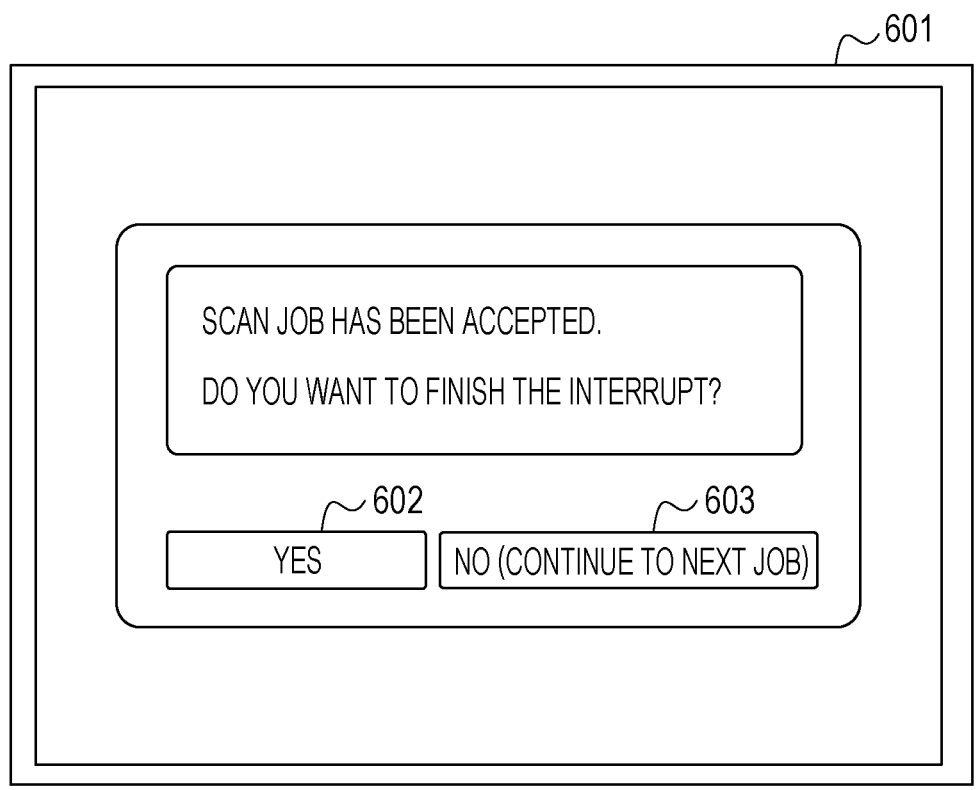
FIG. 6 is a diagram illustrating an example screen for finishing an interrupt scan according to the embodiment.

In S410, the CPU 103 instructs the operation unit control unit 108 to display an interrupt finish button illustrated in FIG. 6. In response to the instruction, a screen illustrated in FIG. 6 is displayed on the operation unit 114. A screen 601 is a screen for accepting, when one interrupt scan job is complete, input as to whether to execute another interrupt scan job or to finish the interrupt scan function. The user selects a YES button 602 to finish the interrupt scan function, or selects a NO (continue to next job) button 603 to continuously execute another scan.

In S411, the CPU 103 determines whether the YES button 602 for finishing the interrupt scan is selected. If it is determined that the YES button 602 is not selected, the CPU 103 returns the process to S408. If it is determined that the YES button 602 is selected, the CPU 103 advances the process to S412.

Figure 7:
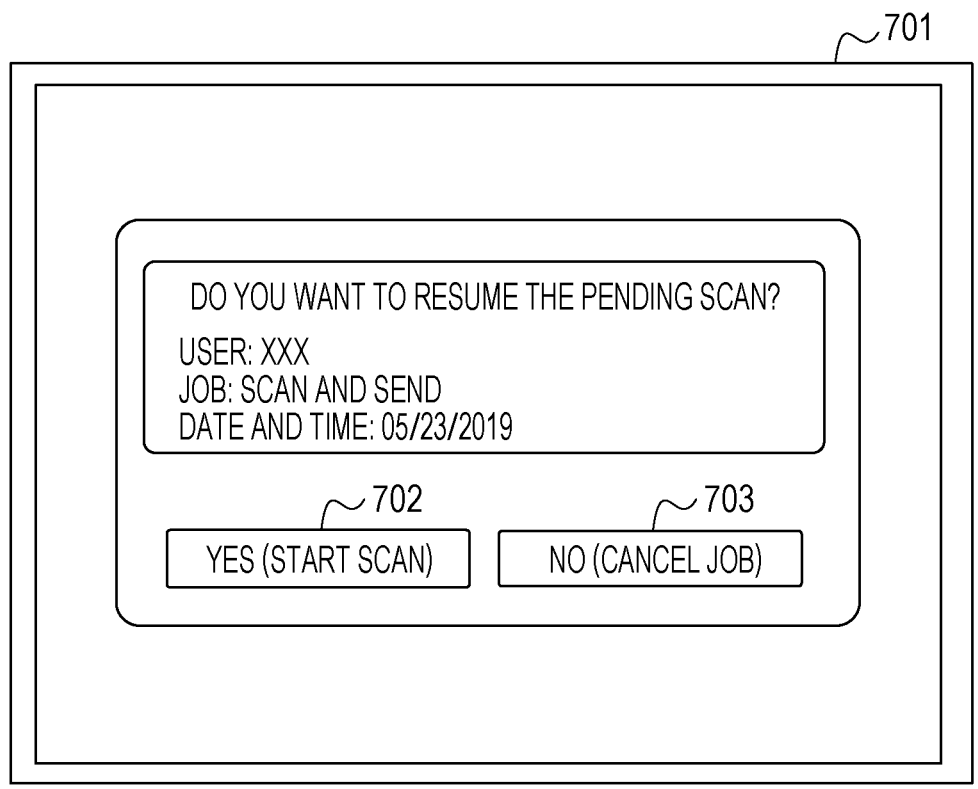
FIG. 7 is a diagram illustrating an example screen for resuming a pending scan job according to the embodiment.

In S412, the CPU 103 instructs the operation unit control unit 108 to display on the operation unit 114 a screen illustrated in FIG. 7 for selecting whether to resume the preceding scan. In response to the instruction, the screen illustrated in FIG. 7 is displayed on the operation unit 114. FIG. 7 illustrates a screen for selecting whether to resume the preceding scan. A screen 701 accepts input as to whether to resume the previously executed preceding scan job. The user selects a YES (Start scan) button 702 to resume the preceding scan job, or selects a NO (Cancel job) button 703 to cancel the preceding scan.

In S413, the CPU 103 determines whether the YES (Start scan) button 702 is selected. If it is determined that the YES (Start scan) button 702 is selected, the CPU 103 advances the process to S414. If it is determined that the NO (Cancel job) button 703 is selected, the CPU 103 ends the process.

In S414, the CPU 103 reads the settings for the pending preceding scan job from the accumulation memory 105 and displays on the operation unit 114 a screen that reflects the settings.

In S415, the CPU 103 executes the process illustrated in FIG. 3 on the rest of the original document to be read in the preceding scan job, which is placed on the original document tray 0200 for the preceding scan job, based on the settings for the preceding scan job. Then, the process ends.

With the control described above, when a read job for an original bundle is interrupted by a read job for another original bundle, the respective reading results of both original bundles can be appropriately output.

Second Embodiment

The first embodiment has described a method for resuming a pending preceding scan job when one preceding scan job is pending. A second embodiment describes a case where a further interrupt scan job is executed during the execution of an interrupt scan job.

An operation for making a further interrupt scan feasible during an interrupt scan will be described with reference to a flowchart illustrated in FIG. 8. A program for the control unit 115 to perform the process is stored in the ROM 102 of the control unit 115, read into the RAM 104, and executed by the CPU 103.

Figure 8:
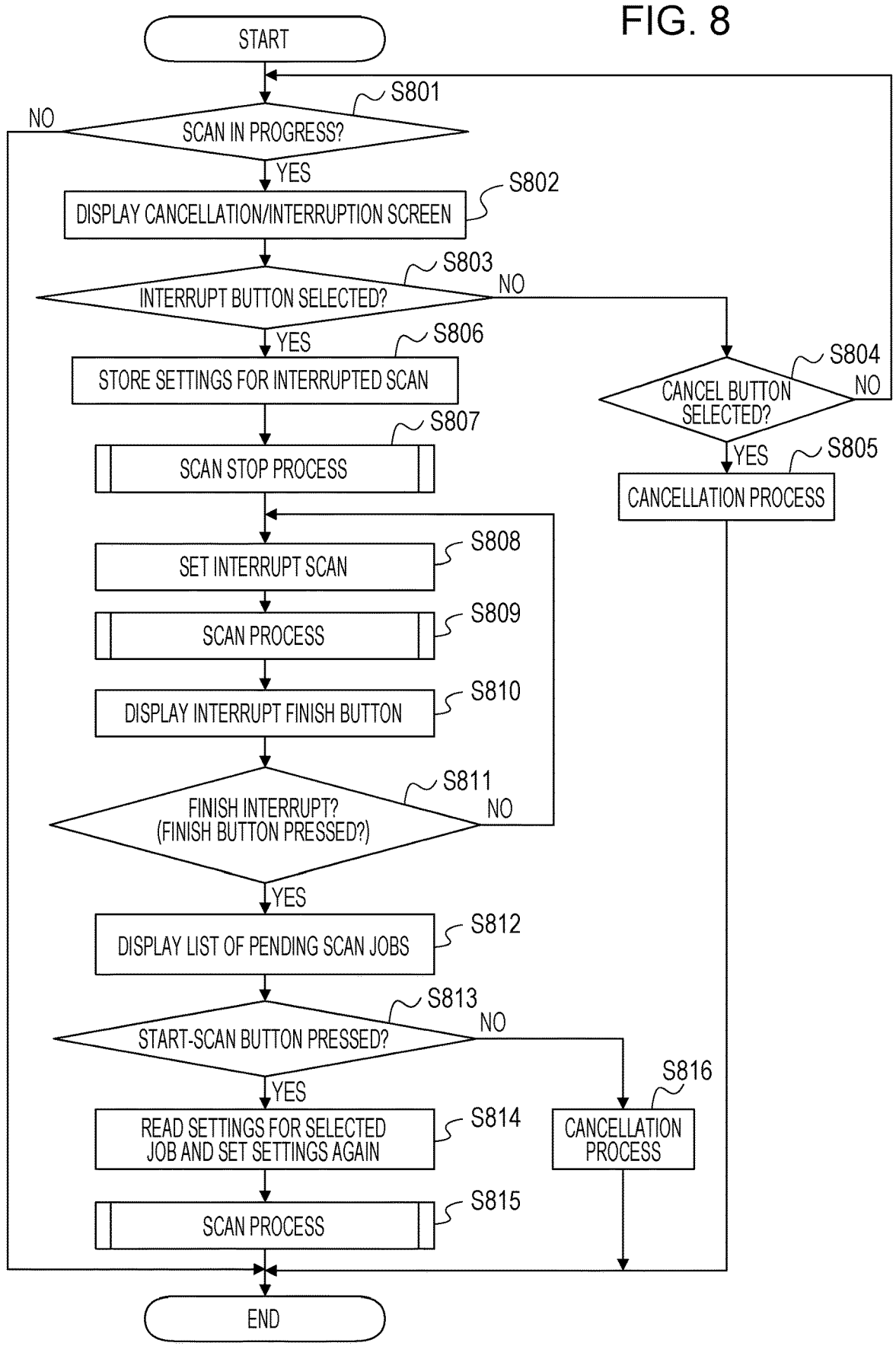
FIG. 8 is a flowchart illustrating an interrupt scan according to a second embodiment.

The processing of S801 to S811 in FIG. 8 is similar to the processing of S401 to S411 in FIG. 4 and will not be described.

If it is determined in S811 in FIG. 8 that the YES button 602 for finishing the interrupt scan is selected, the CPU 103 advances the process to S812. In S812, the CPU 103 instructs the operation unit control unit 108 to display a screen illustrated in FIG. 9 on the operation unit 114. In response to the instruction, the screen illustrated in FIG. 9 is displayed on the operation unit 114. The screen illustrated in FIG. 9 is a screen presenting a list of pending scan jobs, in which the type of each of the pending scan jobs, the name of a user who has given an instruction to execute the corresponding job, and the date and time at which the corresponding instruction was accepted are displayed. "Scan and send" indicates a SEND job, and "Copy" indicates a COPY job. On a screen 901, a user selects one of the pending preceding scan jobs. The operation unit 114 accepts the selection of a pending preceding scan job from the user. To resume a preceding scan job, the user selects the preceding scan job to be resumed from the job list on the screen 901 and then selects a YES (Start scan) button 902. To cancel a pending preceding scan job, the user selects the preceding scan job to be canceled from the job list on the screen 901 and then selects a NO (Cancel job) button 903.

In S813, the CPU 103 determines whether the YES (Start scan) button 902 is selected. It if is determined that the NO (Cancel job) button 903 is selected, the CPU 103 advances the process to S816. In S816, the CPU 103 executes a cancellation process for canceling the selected job. If it is determined that the YES (Start scan) button 902 is selected, the CPU 103 advances the process to S814.

In S814, the CPU 103 reads the settings for the selected scan job and displays on the operation unit 114 a screen that reflects the settings.

In S815, the CPU 103 executes the scan job selected on the screen illustrated in FIG. 9, based on the settings for the scan job read in S814. Then, the process ends.

When a further interrupt scan job is executed during the execution of an interrupt scan job, a user can select a scan job to be resumed from among a plurality of scan jobs and resume the selected scan job.

Third Embodiment

The first and second embodiments have described a method for interrupting a preceding scan, executing an interrupt scan, and then resuming the preceding scan.

A third embodiment describes an example in which a user performs setting to give priority to the completion of the preceding scan to avoid the delay of the completion of the preceding scan job due to the execution of an interrupt scan job. In the third embodiment, settings are provided to control the feasibility of an interrupt scan. This setting is hereinafter referred to as interrupt scan availability setting. A user who has given an instruction to execute the preceding scan job sets an interrupt scan to be disabled in the interrupt scan availability setting to cause the multifunctional device to preferentially execute the preceding scan job. This avoids the delay of the completion of the preceding scan job.

In the third embodiment, an interrupt scan availability setting for determining the feasibility of an interrupt scan job is added to the first embodiment.

Figure 10:
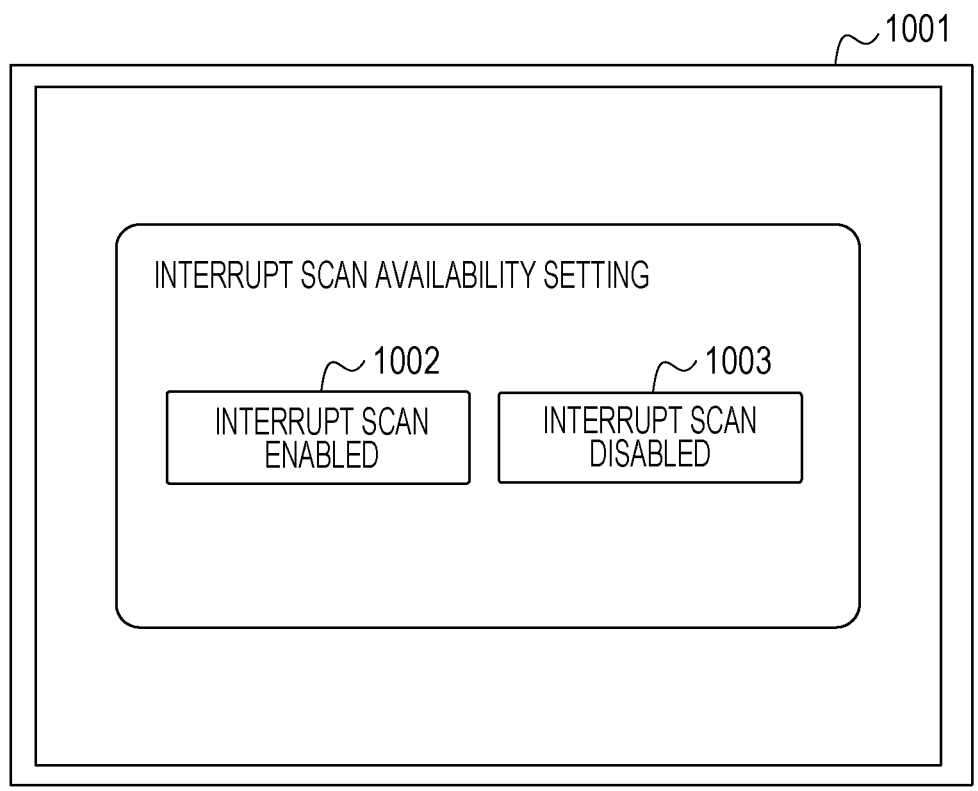
FIG. 10 is a diagram illustrating an example setting screen for interrupt scan availability setting according to a third embodiment.

A method for setting an interrupt scan availability setting through the operation unit 114 will be described with reference to FIG. 10.

A screen 1001 is a setting screen for the interrupt scan availability setting. The screen 1001 can be invoked in a user mode as a device setting of the multifunctional device. If it is determined that a button 1002 for permitting the execution of an interrupt scan is selected, the CPU 103 stores the setting to permit the execution of the interrupt scan in the accumulation memory 105. If it is determined that a button 1003 for inhibiting the execution of an interrupt scan is selected, the CPU 103 stores the setting to inhibit the execution of the interrupt scan in the accumulation memory 105.

Figure 12:
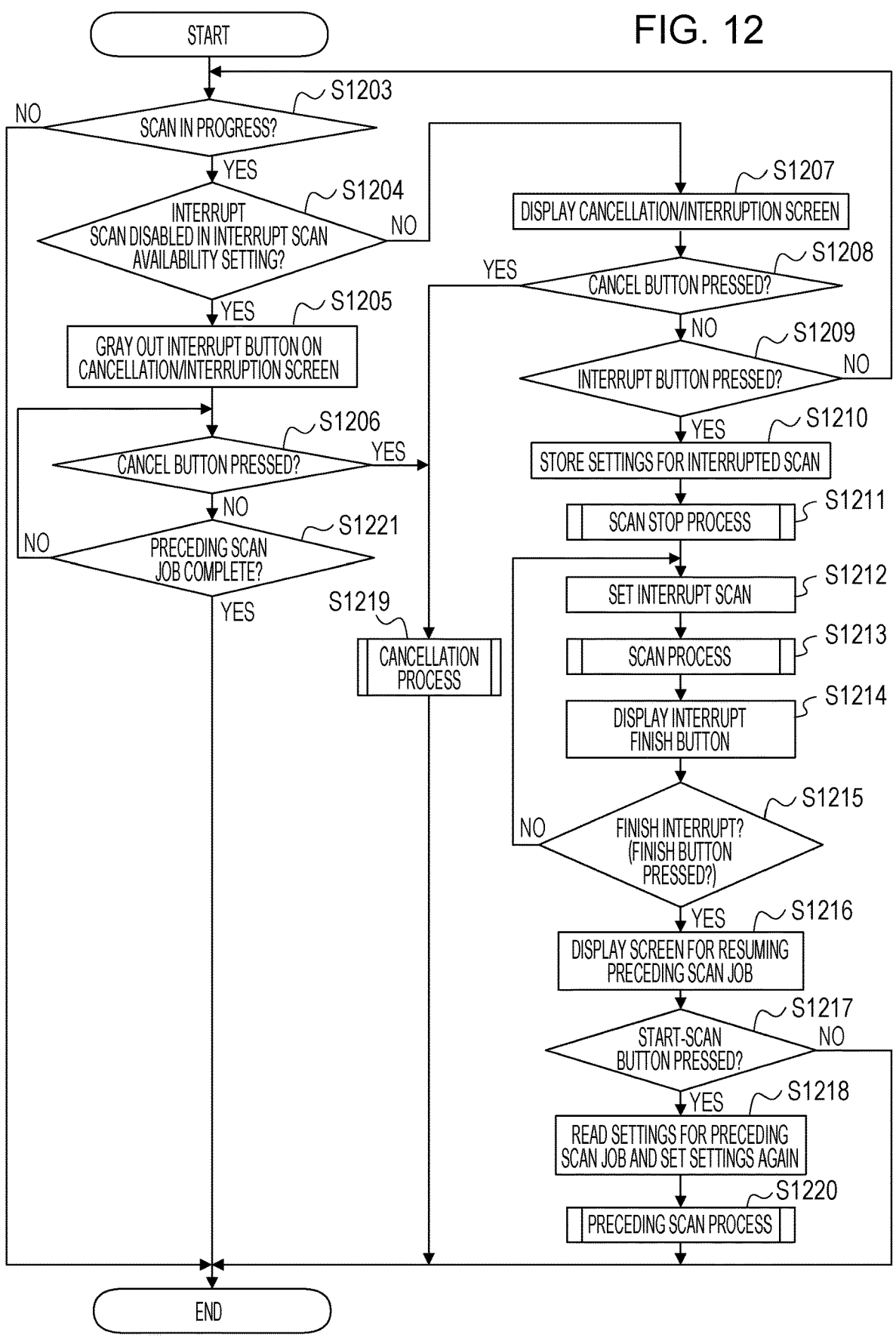
FIG. 12 is a flowchart illustrating an interrupt scan according to the embodiment.

FIG. 12 is a flowchart illustrating an interrupt scan operation performed by the control unit 115 according to the third embodiment. A program for the control unit 115 to perform the operation is stored in the ROM 102 of the control unit 115, read into the RAM 104, and executed by the CPU 103.

In S1203, the CPU 103 determines whether a scan job is being executed. If it is determined that a scan job is being executed, the CPU 103 advances the process to S1204. If it is determined that a scan job is not being executed, the CPU 103 ends the process illustrated in the flowchart in FIG. 12.

In S1204, the CPU 103 refers to the content of the setting as to the interrupt scan availability setting stored in the accumulation memory 105 and switches processes in accordance with the content of the setting. If the interrupt scan availability setting is the setting to inhibit the execution of an interrupt scan, the CPU 103 advances the process to S1205. If the interrupt scan availability setting is the setting to permit the execution of an interrupt scan, the CPU 103 advances the process to S1207.

Figure 11:
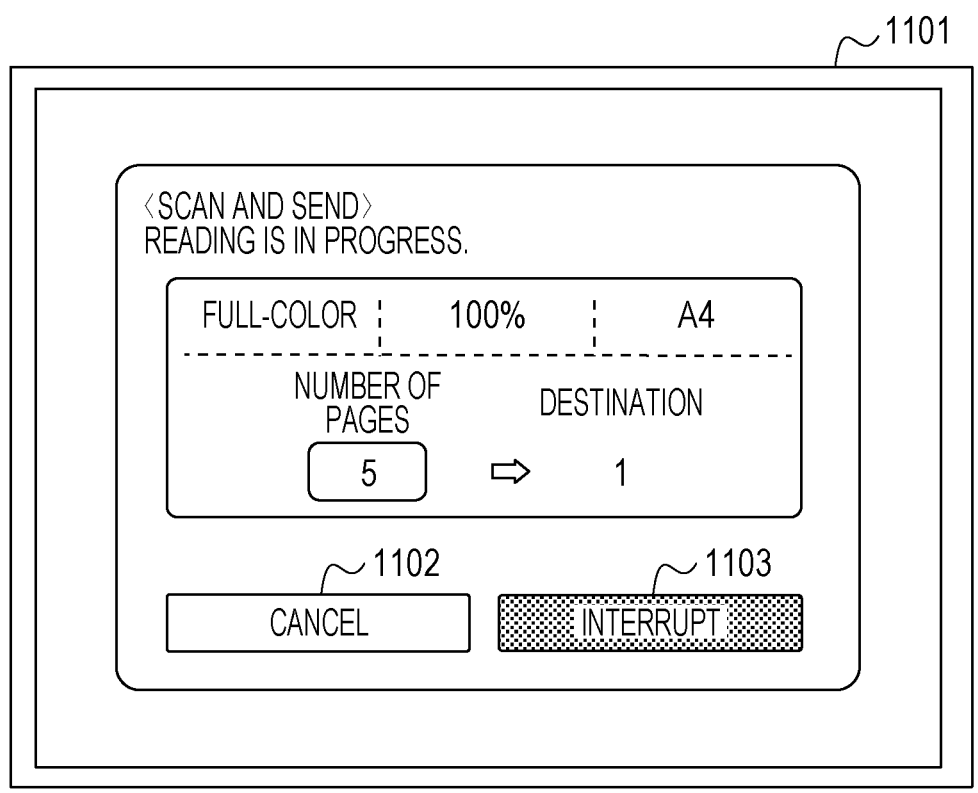
FIG. 11 is a diagram illustrating an example screen according to the embodiment in which an interrupt scan is set to be disabled.

In S1205, the CPU 103 displays a screen illustrated in FIG. 11 on the operation unit 114. The screen illustrated in FIG. 11 is a screen 1101 on the operation unit 114 in which an Interrupt button 1103 is grayed out so as not to accept an interrupt instruction given from a user. The screen illustrated in FIG. 11 may be displayed in such a manner that the Interrupt button 1103 is hidden, rather than grayed out. If the interrupt scan availability setting indicates that an interrupt scan is feasible, the CPU 103 displays the screen illustrated in FIG. 5 on the operation unit 114. On the screen illustrated in FIG. 5, the operation unit 114 accepts the selection of the Interrupt button 503. When the operation unit 114 accepts the selection of the Interrupt button 503, the CPU 103 executes an interrupt scan job.

In S1206, the CPU 103 switches processes in accordance with whether it is determined that a Cancel button 1102 is selected on the screen illustrated in FIG. 11. If it is determined that the Cancel button 1102 is selected, the CPU 103 advances the process to S1219. If it is determined that the Cancel button 1102 is not selected, the CPU 103 advances the process to S1221. In S1221, the CPU 103 determines whether the preceding scan job is complete. If it is determined that the preceding scan job is not complete, the CPU 103 returns the process to S1206. If it is determined that the preceding scan job is complete, the CPU 103 ends the process illustrated in FIG. 12.

If the process proceeds from S1204 to S1207, in S1207, the CPU 103 displays the cancellation/interruption screen 501 illustrated in FIG. 5 on the operation unit 114.

In S1208, the CPU 103 switches processes in accordance with whether it is determined that the Cancel button 502 is selected on the cancellation/interruption screen 501 illustrated in FIG. 5. If it is determined that the Cancel button 502 is selected, the CPU 103 advances the process to S1219 to cancel the scan operation. If it is determined that the Cancel button 502 is not selected, the CPU 103 advances the process to S1209.

In S1209, the CPU 103 switches process in accordance with whether it is determined that the Interrupt button 503 is selected. If it is determined that the Interrupt button 503 is selected, the CPU 103 advances the process to S1210 to execute an interrupt scan. If it is determined that the Interrupt button 503 is not selected, the CPU 103 returns the process to S1203.

The processing of S1210 to S1218 is the same as the processing of S406 to S414 in FIG. 4, and thus a detailed description thereof is omitted.

In S1219, the CPU 103 executes a process of canceling the scan job. Then, the process ends.

In S1220, the CPU 103 resumes the process for the preceding scan job. After the completion of the preceding scan job, the process illustrated in FIG. 12 ends.

Figure 13A:
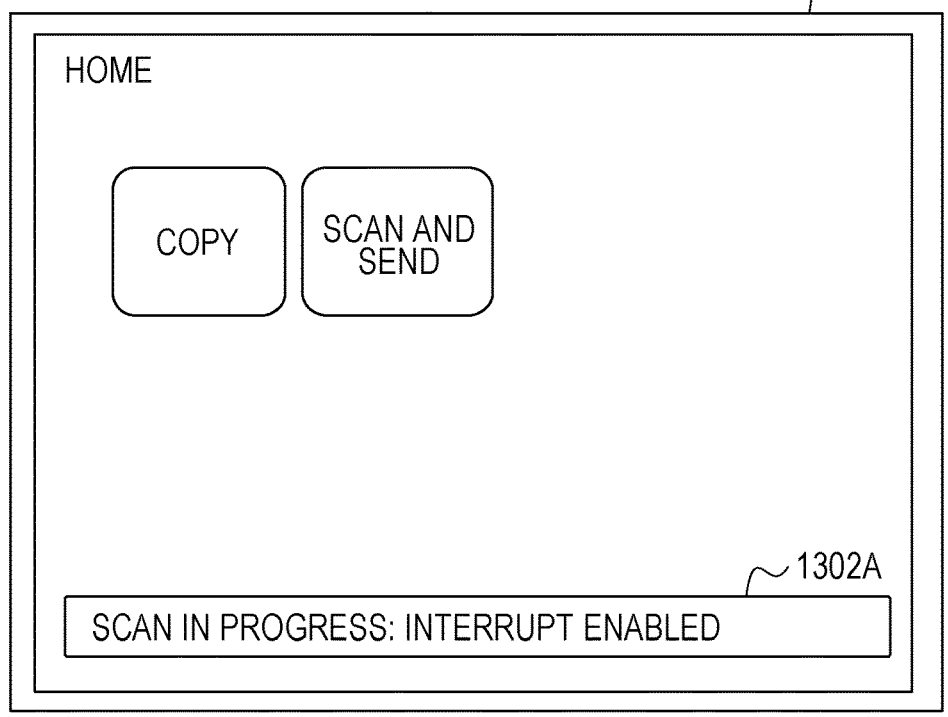
FIGS. 13A and 13B are diagrams illustrating example screens presenting interrupt scan availability setting according to the embodiment.
Figure 13B:
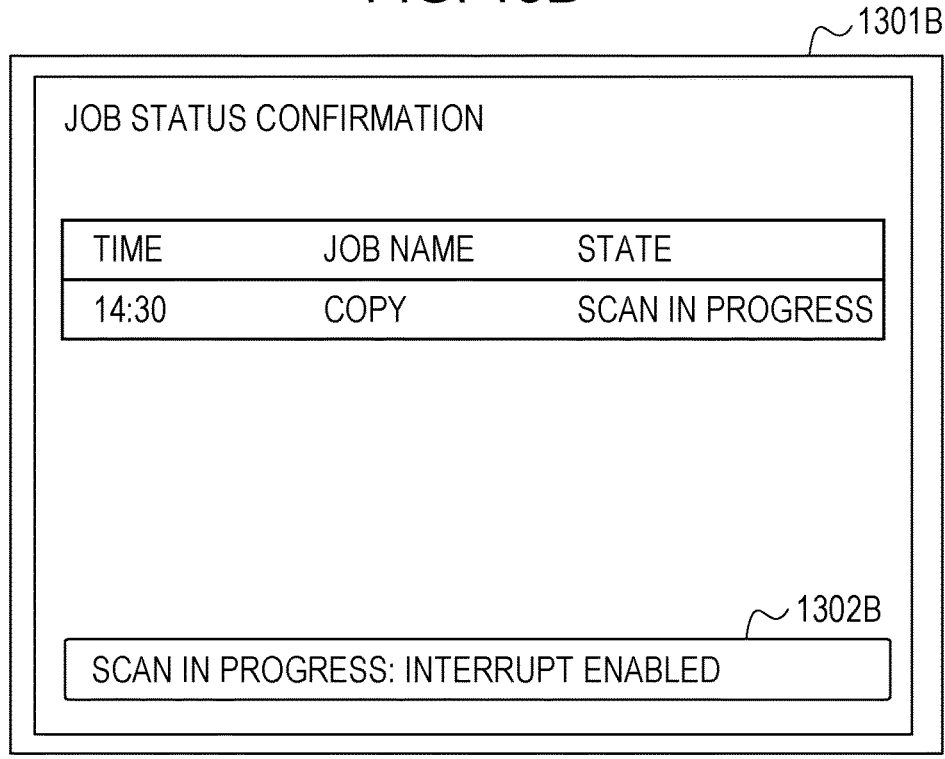

FIGS. 13A and 13B illustrate screens on the operation unit 114 to present the content of the setting as to the interrupt scan availability setting. A user is able to determine whether the interrupt scan function is enabled by viewing the setting screen illustrated in FIG. 10, the screen illustrated in FIG. 5, or the screen illustrated in FIG. 11.

However, if the screen on the operation unit 114 during a scan has transitioned to any other screen (for example, a screen 1301A or a screen 1301B), the user is not able to recognize the feasibility of an interrupt scan. An example will be described in which the content of the setting as to the interrupt scan availability setting is presented on a screen (for example, the screen 1301A or the screen 1301B) other than the setting screen illustrated in FIG. 10, the screen illustrated in FIG. 5, or the screen illustrated in FIG. 11 to allow the user to recognize the feasibility of an interrupt scan.

The screen 1301A illustrated in FIG. 13A is a home screen including a button for showing a setting screen for a COPY job, and a button for showing a setting screen for a SEND job. The CPU 103 displays the feasibility of an interrupt scan in a status line 1302A on the screen 1301A to notify the user of the feasibility of an interrupt scan. When an interrupt scan is permitted, the message "interrupt enabled" is displayed. When an interrupt scan is inhibited, the message "interrupt restricted" is displayed.

The screen 1301B illustrated in FIG. 13B is a job status screen displayed by operating the operation unit 114. The CPU 103 displays the feasibility of an interrupt scan in a status line 1302B on the screen 1301B to notify the user of the feasibility of an interrupt scan. When an interrupt scan is permitted, the message "interrupt enabled" is displayed. When an interrupt scan is inhibited, the message "interrupt restricted" is displayed.

Screens other than a screen for cancellation/interruption are not limited to a home screen and a job status screen.

In the third embodiment, the interrupt scan availability setting is set as a device setting of the multifunctional device and the set content thereof for one job is left and reflected in the subsequent job or jobs even after the one job is complete, by way of example but not limitation. The interrupt scan availability setting may be set on a job-by-job basis, stored in the RAM 104, and returned to the content of the original settings in response to the completion of a job.

There are differences between the first and second embodiments, namely, the number of preceding scan jobs and the type of method for resuming a preceding scan job after the completion of an interrupt scan job. The interrupt scan availability setting is not affected by these differences, and thus an embodiment in which the interrupt scan availability setting is added to the second embodiment will not be described.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-120042 filed on Jun. 27, 2019, which is hereby incorporated by reference herein in its entirety.

What is claimed is:

1. An image reading apparatus comprising:
a reading unit configured to read an original document;
an interrupt unit configured to interrupt a first read job for reading a first original bundle by the reading unit;
a control unit configured to execute a second read job, different from the first read job, for reading a second original bundle, different from the first original bundle, by the reading unit while the first read job is interrupted by the interrupt unit; and
a selection unit configured to select, from among one or more read jobs interrupted by the interrupt unit, a selected read job to be resumed after the second read job of the second original bundle is completed.

2. The image reading apparatus according to claim 1, wherein, in a case where the second read job of the second original bundle is completed, the control unit resumes the selected read job.

3. The image reading apparatus according to claim 1, wherein the control unit is configured to control the reading unit to execute a third read job after the second read job of the second original bundle is completed while the first read job is interrupted by the interrupt unit.

4. The image reading apparatus according to claim 1, further comprising a display unit configured to display a list of the one or more read jobs interrupted by the interrupt unit,
wherein the selection unit selects the selected read job to be resumed after the second read job of the second original bundle is completed.

5. The image reading apparatus according to claim 4, wherein the one or more read jobs are pending, and
wherein the list shows a type of each of the one or more pending read jobs, and a date and time at which an instruction to execute each of the one or more pending read jobs was accepted.

6. The image reading apparatus according to claim 4, wherein the one or more read jobs are pending, and
wherein the list shows a user name of a user who gave an instruction to execute each of the one or more pending read jobs.

7. The image reading apparatus according to claim 1, further comprising an acceptance unit configured to accept an instruction to interrupt the first read job,
wherein the interrupt unit interrupts the first read job in response to the acceptance unit accepting the instruction.

8. The image reading apparatus according to claim 1, further comprising an input unit configured to input reading settings for the second read job after the first read job is interrupted,
wherein the control unit controls the reading unit to execute the second read job in accordance with the reading settings input by the input unit.

9. The image reading apparatus according to claim 1, further comprising a printing unit configured to print an image read by the reading unit.

10. A method for an image reading apparatus having a reading unit configured to read an original document, the method comprising:
interrupting a first read job for reading a first original bundle by the reading unit;
executing a second read job, different from the first read job, for reading a second original bundle, different from the first original bundle, by the reading unit while the first read job is interrupted; and
selecting, from among one or more read jobs interrupted, a selected read job to be resumed after the second read job of the second original bundle is completed.

11. A non-transitory computer-readable storage medium storing a computer program to cause a computer to perform a method for an image reading apparatus having a reading unit configured to read an original document, the method comprising:
interrupting a first read job for reading a first original bundle by the reading unit;
executing a second read job, different from the first read job, for reading a second original bundle, different from the first original bundle, by the reading unit while the first read job is interrupted; and
selecting, from among one or more read jobs interrupted, a selected read job to be resumed after the second read job of the second original bundle is completed.

* * * * *